April 16, 1935.　　C. A. SAWTELLE ET AL　　1,998,097
BRAKE ASSEMBLY
Filed Jan. 25, 1932　　3 Sheets-Sheet 1

INVENTOR
Charles A. Sawtelle
BY
Whittemore Hulbert W. Whittemore & Belknap
ATTORNEYS

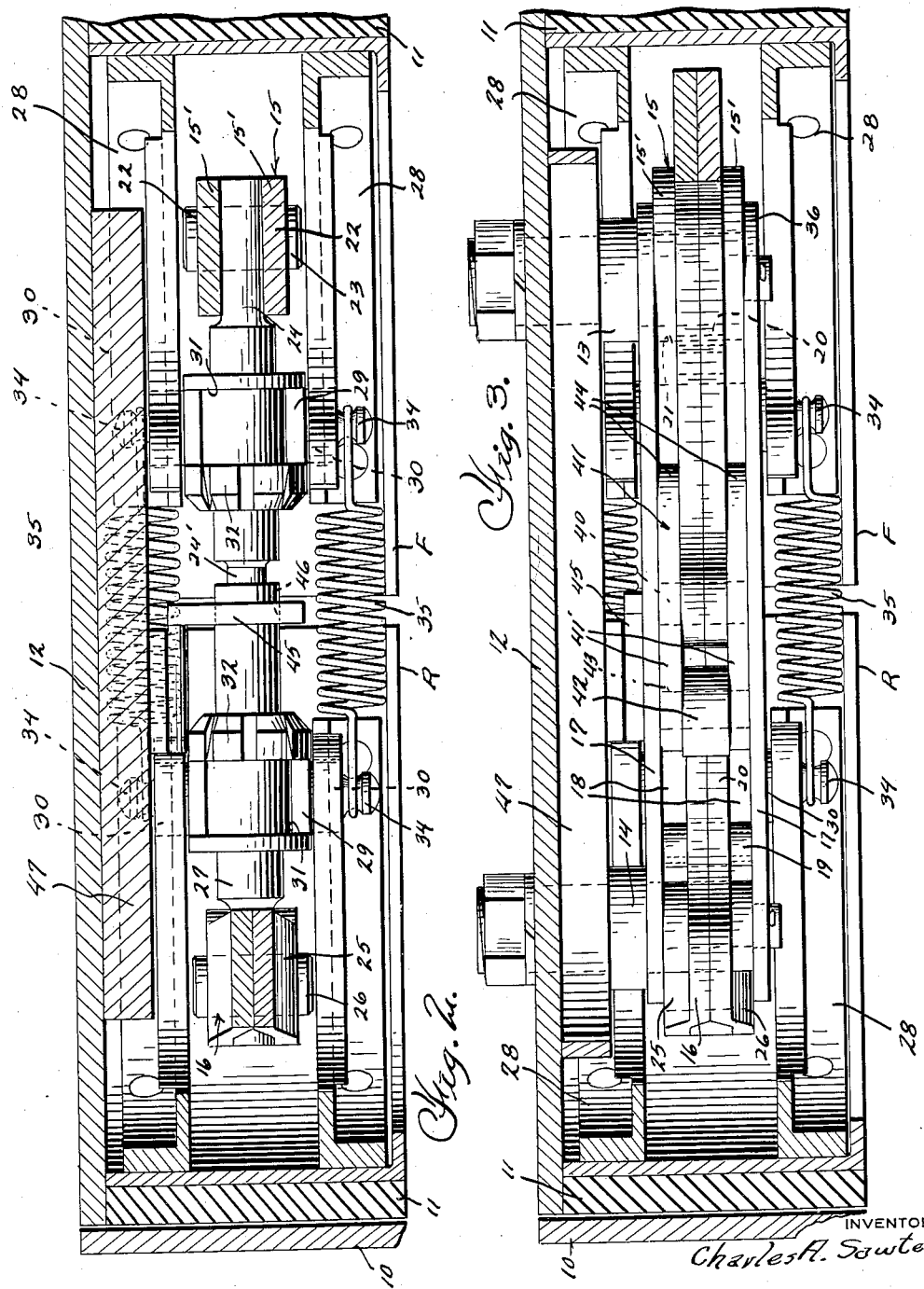

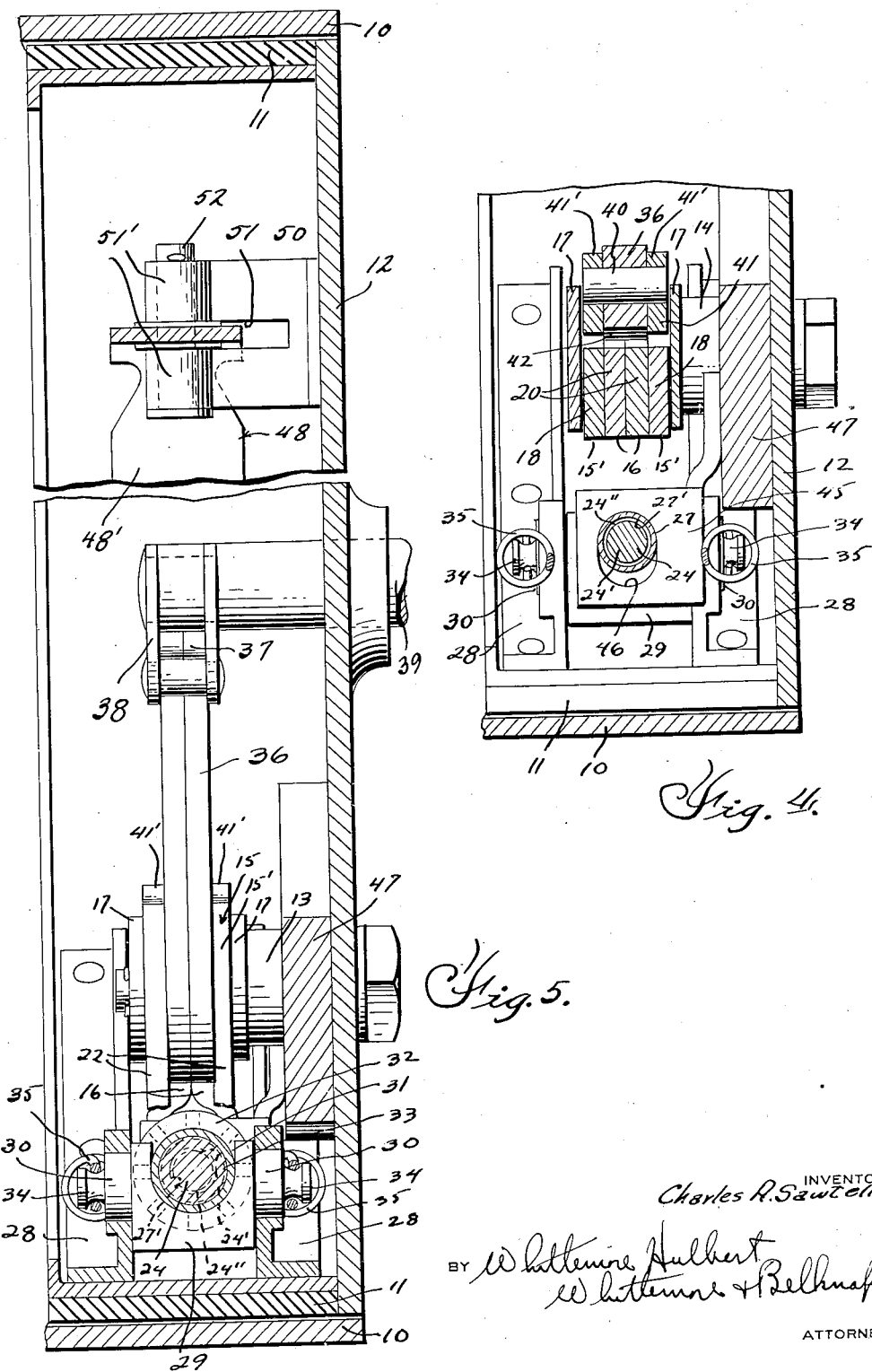

Patented Apr. 16, 1935

1,998,097

UNITED STATES PATENT OFFICE 1,998,097

BRAKE ASSEMBLY

Charles A. Sawtelle, Detroit, Mich., assignor, by direct and mesne assignments, to S. and D. Engineering Company, Detroit, Mich., a corporation of Michigan Application January 25, 1932, Serial No. 588,752

14 Claims. (Cl. 188—78)

This invention relates to brake assemblies and more particularly to that type of brake assembly comprising a brake drum and an internal flexible braking element or band together with mechanism for expanding the element into frictional contact with the drum.

An object of the invention is to provide a brake assembly of this type in which the wrapping force of the brake band or element operates to counteract the unwrapping force, the system of levers which connect the ends of the brake band being such that in either direction of rotation of the drum, there will be a preponderance of the wrapping force, thereby making the brake to a certain extent self-energizing.

Another object of the invention is to provide an assembly wherein the adjacent ends of the braking element or band are interconnected by means whereby the ends will be moved uniformly into engagement with the drum upon application of the brakes and also uniformly moved out of engagement.

Still another object of the invention is to provide a construction wherein a simple but efficient means is provided for maintaining the band uniformly in contact with the drum throughout its length upon an application of the brake and to uniformly move the band out of contact with the drum and maintain the same centered when the brakes are released.

The several objects, advantages and novel details of construction of the invention will be made more apparent as this description proceeds, especially when considered in connection with the accompanying drawings, wherein.

Figure 2 is an enlarged detail sectional elevational view taken substantially on the plane indicated by line 2—2 in Figure 1;

Figure 3 is an enlarged detail sectional elevational view taken substantially on the plane indicated by line 3—3 in Figure 1;

Figure 4 is an enlarged vertical sectional view taken substantially on the plane indicated by line 4—4 in Figure 1, and Figure 5 is a sectional elevational view taken substantially on the plane indicated by line 5—5 in Figure 1.

Figure 1:
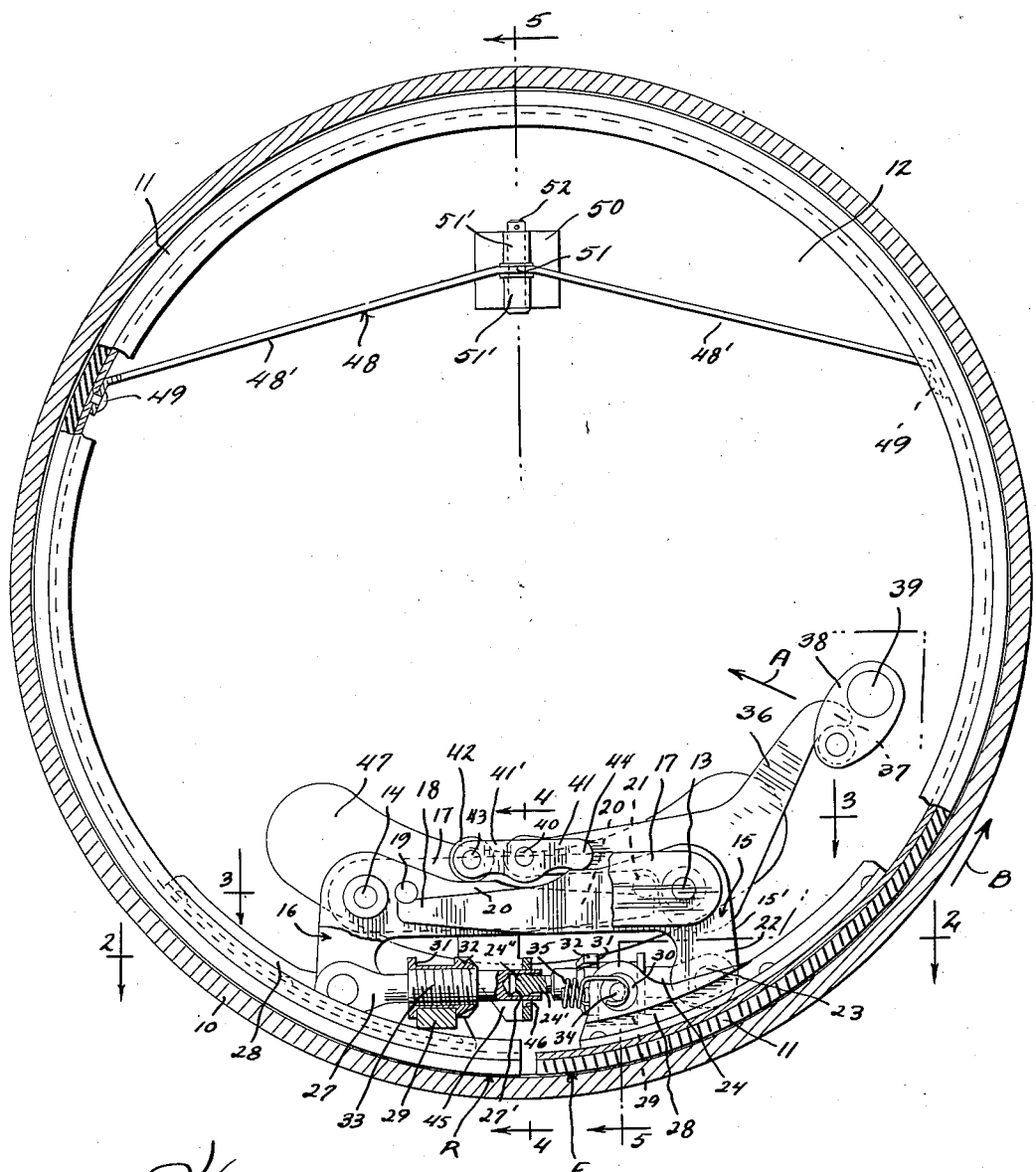
Figure 1 is a side elevational view of the brake mechanism.

Referring to the drawings it will be noted that there is illustrated a brake drum 10 with which a brake band 11 is adapted to engage. The reference character 12 indicates a backing plate which is non-rotatably fixed upon the axle (not shown).

Fixed to the backing plate 12 are pivots 13 and 14 upon which bell crank levers indicated generally by the reference characters 15 and 16, are pivotally mounted. The bell crank lever 15 comprises a pair of links 15' of similar shape which straddle or receive between them the bell crank lever 16. The two bell crank levers 15 and 16 are received between a pair of tie plates 17 which are fixed at the ends respectively, on the pivots 13 and 14.

The long arm 18 of the bell crank lever 15 terminates adjacent the pivotal point 14 of the bell crank lever 16, and the end of this arm 18 extends under and engages a stop pin 19 carried by the bell crank lever 16, this pin projecting from opposite sides of this bell crank lever to engage each of the pair of links 15' of the bell crank lever 15. In a similar manner the long arm 20 of the bell crank lever 16, terminates adjacent the pivotal mounting 13 of the bell crank lever 15 and extends under and engages a stop pin 21 carried by the bell crank lever 15.

Accordingly, these two bell crank levers are interconnected together in such a manner that a downwardly rocking movement imparted to the long arm of either lever acts through its corresponding pin 19 or 21 to cause a corresponding downward movement of the other bell crank lever.

The short arm 22 of bell crank lever 15 is pivotally connected as at 23 to a bolt member 24 whereas the short arm 25 of bell crank lever 16 is pivotally connected as at 26 to a bolt member 27. These bolt members 24 and 27 are interconnected for simultaneous rocking movement, the means for interconnecting being here shown as a telescoping connection, the bolt 24 being provided with a reduced end 24' which enters a recess 27' in the bolt 27. The end of the reduced portion 24' is provided with a head portion 24'' so that the bolts 24 and 27 may rock while still maintaining an interconnecting contact between the parts. The purpose of this structure is to provide for a uniform movement of the brake ends toward and away from the drum, the movement of either brake end effecting through the interconnecting links or bolts 24—27, a corresponding movement of the other brake band end.

Attached to each end of the brake band 11 is a pair of spaced bracket plates 28. Mounted in each pair of bracket plates 28 is a yoke member 29, each yoke member being provided with opposed trunnions 30 engaging apertures in the bracket plates 28. Each yoke member engages a groove 31 in an adjusting collar 32, there being a collar 32 on each of the links or bolts 24 and 27. The collars 32 engage threaded portions 33 on the bolts so that by rotating these adjusting collars, the brake band may be adjusted to compensate for wear.

Thus, it will be seen that the movement of the bell crank levers 15 and 16 is transmitted to the brake band ends respectively, through the links or bolts 24 and 27 and through the respective adjusting collars 32 and thence through the yoke members 29 to the brackets 28 secured to the brake band ends.

In order to move the brake band to released position when the brakes are released, projections 34 may be provided on the ends of the trunnions 30 to which the ends of springs 35 are connected. These springs tend to normally draw the ends of the brake band together into releasing position.

For actuating the bell crank levers 15 and 16 I provide an actuating lever 36 which is pivoted on the pivot 13. This lever has an end portion 37 engaged by an actuating element 38 on the brake operating shaft 39.

Pivotally mounted as at 40 to the other end of the lever is a rocker plate or member 41, the latter comprising a pair of plate members 41' which straddle the end of the lever 36. Mounted between the plate members 41' of the rocker plate member 41 at one end is a roller 42 journaled on a pivot 43. This roller engages the upper edge of the bell crank lever 16. The opposite ends of the rocker plate members 41' engage the upper edges of the long arms 18 of the pair of links 15' of the bell crank lever 15.

When the brake actuating lever 36 is rocked about its pivot 13 in the direction of the arrow A, the opposite end thereof will be rocked in a downward direction and through the rocker plate member 41 will exert a downward pressure upon the long arms of the bell crank levers. If the brake band is rotating in the direction of the arrow B, the wrapping force will be developed in the brake end indicated by the reference character F, whereas the other end indicated by the reference character R, will act as the heel. Under these conditions the preponderance of force will be exerted through the bell crank lever 15 and the wrapping force which tends to move the brake band end F into engagement with the brake drum will also act to rock the bell crank lever 15 and through the stop pin 21 carried by this bell crank lever will act through the long arm 20 of the other bell crank lever 16, to hold the brake band end R to resist the unwrapping force exerted thereon by reason of the rotation of the brake drum.

During this movement the rocker plate member 41 will rock slightly about its pivot 40, causing the ends 44 to maintain engagement with the long arms 18 of the bell crank lever 15 so that a continued application of pressure is possible.

By reason of the overlapping arrangement of the long arms of the bell crank levers, it will be apparent that the pressure exerted by the stop pin 21 of the bell crank lever 15 through the long arm of the bell crank lever 16, will be adequate to hold the heel end R of the brake band when the brake drum is rotating in the direction of the arrow B, so that the force of holding the heel on the brake band is taken up by the mechanism itself and is not transmitted fully to the brake pedal.

It will be noted that the long arm 20 of the bell crank lever 16 terminates adjacent the pivot 13 of the bell crank lever 15 and that the stop pin 21 which acts upon the long arm 20 of bell crank lever 16 is also located adjacent the pivot 13 of bell crank lever 15. Thus, there is established in this action of the levers, a ratio corresponding to the distance between the pivot 13 and the stop pin 21 on the one hand, and the distance between the stop pin 21 and the pivot 14 on the other hand.

In a like manner, when the brake drum is rotating in a direction opposite to that indicated by the arrow B, the brake band end R becomes the wrapping end, whereas the end F becomes the heel. However, in this direction of rotation of the drum, the wrapping force imparted to the brake band end R acts through the bell crank lever 16 and stop pin 19 on the end of the long arm 20 of the bell crank lever 15 with a multiplied leverage to adequately hold the heel so that the pressure necessary to hold the heel need not be carried by the brake pedal. In this direction of rotation of the brake drum, the force to actuate the brakes is applied through the roller 42 of the rocker plate member 41.

In all movements of the brake band ends, interconnected bolts or links 24—27 operate to move the band ends uniformly toward the brake drum. In order to limit the movement of the brake band ends in the opposite direction, I provide a bracket 45 having an opening 46 formed therein through which the bolt members 24 and 27 extend, see particularly Figures 1 and 4. This opening is elongated in the direction of movement of the bolt members and when the brake is released and the springs 35 have retracted, the brake band ends of the bolt members are limited in their upward movement as viewed in Figures 1 and 4, by engagement with the top end of the opening 46. This opening is long enough to provide for free movement of the bolt members in the opposite direction.

For adequately reinforcing the backing plate at the area at which the brake operating mechanism is mounted, I provide a carrier plate 47, see particularly Figure 4.

In order to provide a simple and economical but effective means for centering the flexible brake band or element and at the same time permit the same to flex uniformly into engagement with the brake drum, I provide a spreader 48, see particularly Figures 1 and 5, in the form of an elongated member formed of resilient metal. The ends of this spreader are connected as at 49 to the brake band, the tendency of the arms 48' of the spreader being to force the brake band radially outwardly and upwardly as viewed in Figure 1. This spreader is mounted in a bracket 50 fixed to the backing plate, this bracket being slotted as at 51 to receive the spreader and to permit any lateral movement thereof. This bracket is in the form of a resilient plate having a sleeve portion 51' to receive an anchoring pin 52 which passes through this sleeve portion and through an aperture in the spreader. As viewed in Figure 1, the projecting portion of the bracket may be flexed slightly to the left or right during the circumferential shifting movement of the brake band but when relieved of the force tending to so move it, the bracket will return to normal centering position. In a like manner the arms 48' of the spreader 48 flexes slightly to permit this movement of the brake band but upon releasing of the brake these arms will act to center the band as will be obvious.

While an embodiment of the invention has been described herein somewhat in detail, it will be apparent to those skilled in this art that various changes may be resorted to without departing from the spirit and scope of the invention, and to this end reservation is made to make such changes as may come within the purview of the accompanying claims.

What is claimed is,

1. In a brake mechanism, a brake element having ends, levers connected to said ends, and means interconnecting said levers for operating either from the other at an increased leverage ratio.

2. In a brake mechanism, a brake element having ends, a pair of bell crank levers having one arm of each lever connected respectively to said ends, and means interconnecting the other arms of said bell crank levers for operating either from the other at an increased leverage ratio.

3. In a brake mechanism, a brake element having ends, linkage connecting said ends including a pair of bell cranks having overlapping arms, and means on each overlapping arm located relatively close to its pivot engaging with the other arm at a point spaced from its pivot for actuating the corresponding bell crank at an increased leverage ratio.

4. In a brake mechanism, a brake element having ends, linkage interconnecting said ends including a pair of bell crank levers having overlapping arms, and means adjacent the pivot of each bell crank lever engageable with the overlapping arm of the other bell crank lever adjacent the end thereof for actuating the same at an increased leverage ratio.

5. In a brake mechanism including a brake element having a pair of ends, linkage between said ends comprising a pair of bell cranks each having a long arm which overlaps the other, the other arm of each bell crank connected to an end of the brake element, and means on each long bell crank arm engaging the other adjacent its end to rock either bell crank upon movement of the other at an increased leverage ratio.

6. In a brake assembly including a brake drum, a flexible brake element having ends which in each direction of rotation of the drum have imparted thereto alternately a wrapping force and and an unwrapping force, a pair of bell cranks having fixed pivots, each bell crank having a short arm connected to one of said brake element ends, each bell crank having a long arm which overlaps the other, and means on each bell crank adjacent the pivot thereof engageable with the overlapping arm of the other bell crank adjacent the end thereof for operating either from the other at an increased leverage ratio.

7. In a brake assembly including a brake drum, a flexible brake element having ends which in each direction of rotation of the drum have imparted thereto alternately a wrapping force and an unwrapping force, a pair of bell cranks having fixed pivots, each bell crank having a short arm connected to one of said brake element ends, each bell crank having a long arm which overlaps the other, means on each bell crank adjacent the pivot thereof engageable with the overlapping arm of the other bell crank adjacent the end thereof for operating either from the other at an increase leverage ratio, and means engageable with said bell crank levers for rocking the same about their pivots to apply the brakes.

8. In a brake assembly including a rotating brake drum, a backing plate, and a flexible brake element having ends, linkage interconnecting said ends including a pair of bell crank levers having one arm of each lever connected respectively to one of said brake element ends, the other arms of said bell crank levers overlapping, a stop member carried by each of the said latter arms of said bell crank levers and engageable with the corresponding arm of the other bell crank lever, whereby a rocking movement of one of said bell crank levers imparts a rocking movement to the other, the location of said stop members and the point of engagement therewith with the other arm of the other bell crank lever being so selected that one bell crank lever actuates the other at an increased leverage ratio.

9. In a brake assembly of the class described a flexible brake element having ends, a pair of bell crank levers, one arm of each bell crank lever being connected respectively to said brake element ends, the other arms of said bell crank levers overlapping a brake actuating lever, a rocker member pivotally connected to said actuating lever, and means on said rocker member on opposite sides of said pivot point respectively engaging the overlapping arms of said bell crank levers for actuating the same.

10. In a brake assembly of the class described a flexible brake element having a pair of ends, a pair of bell crank levers connected for interdependent operation, bracket means carried by the ends of said brake element, bolt members pivotally connected respectively to one arm of said bell crank levers, and an adjustable connection between each of said bolt members and said brackets.

11. In a brake assembly of the class described a flexible brake element having a pair of ends, a pair of bell crank levers connected for interdependent operation, bracket means carried by the ends of said brake element, bolt members pivotally connected respectively to one arm of said bell crank levers, means interconnecting the adjacent ends of said bolt members, and means adjustably connecting said bolts to said brackets.

12. In a brake assembly of the class described a flexible brake element having a pair of ends, a pair of bell crank levers connected for interdependent operation, bracket means carried by the ends of said brake element, bolt members pivotally connected respectively to one arm of said bell crank levers, longitudinally adjustable nuts on said bolts, and yoke members carried by said brackets and engaging said nuts for connecting said brake element ends to said bell crank levers.

13. In a brake assembly of the class described a flexible brake element having a pair of ends, a pair of bell crank levers connected for inter-dependent operation, bracket means carried by the ends of said brake element, bolt members pivotally connected respectively to one arm of said bell crank levers, means for interconnecting the adjacent ends of said bolt members, and a fixed bracket member engaging the interconnected ends of said bolt members for limiting the movement thereof in one direction.

14. In a brake assembly of the class described a flexible brake element having ends, a pair of bell crank levers capable of differential movement during the application of the brake, one arm of each bell crank lever being connected respectively to said brake element ends, the other arms of said bell crank levers overlapping, a brake actuating lever, and a rocker member carried by said lever having the ends thereof engaging respectively the overlapping arms of said bell crank levers to provide for a continuous operative engagement therewith during the aforesaid differential movement of the bell crank levers.

CHARLES A. SAWTELLE.